(12) United States Patent
Watanabe

(10) Patent No.: US 9,159,009 B2
(45) Date of Patent: Oct. 13, 2015

(54) IMAGE FORMING APPARATUS AND IMAGE OUTPUT APPARATUS

(75) Inventor: Taisuke Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 717 days.

(21) Appl. No.: 13/050,540

(22) Filed: Mar. 17, 2011

(65) Prior Publication Data

US 2011/0235086 A1    Sep. 29, 2011

(30) Foreign Application Priority Data

Mar. 24, 2010   (JP) ................................. 2010-067475

(51) Int. Cl.
*G06K 15/00*   (2006.01)
*H04N 1/00*   (2006.01)

(52) U.S. Cl.
CPC ........ *G06K 15/4095* (2013.01); *H04N 1/00347* (2013.01); *H04N 2201/0049* (2013.01); *H04N 2201/0055* (2013.01); *H04N 2201/0087* (2013.01); *H04N 2201/3205* (2013.01); *H04N 2201/3226* (2013.01)

(58) Field of Classification Search
None
See application file for complete search history.

(56) References Cited

U.S. PATENT DOCUMENTS

| | | | | |
|---|---|---|---|---|
| 5,987,438 | A * | 11/1999 | Nakano et al. .................. 705/41 |
| 7,221,369 | B1 * | 5/2007 | Tripathi et al. ............... 345/532 |
| 7,859,702 | B2 * | 12/2010 | Watanabe .................... 358/1.16 |
| 8,042,174 | B2 * | 10/2011 | Hattori | |
| 8,116,515 | B2 * | 2/2012 | Takahata ...................... 382/100 |
| 8,472,049 | B2 * | 6/2013 | Hanayama .................... 358/1.15 |
| 8,810,376 | B1 * | 8/2014 | Picasso et al. ............. 340/10.52 |
| 2003/0033495 | A1 * | 2/2003 | Lawman et al. .............. 711/163 |
| 2003/0033555 | A1 * | 2/2003 | Joyner et al. .................... 714/11 |
| 2006/0256364 | A1 * | 11/2006 | Yamamoto .................... 358/1.14 |
| 2006/0282466 | A1 * | 12/2006 | Yasukaga et al. .......... 707/104.1 |
| 2007/0053008 | A1 * | 3/2007 | Kadowaki ..................... 358/448 |
| 2007/0143861 | A1 * | 6/2007 | Ohishi ............................ 726/28 |
| 2007/0206216 | A1 * | 9/2007 | Sakagami et al. ........... 358/1.15 |
| 2007/0253013 | A1 * | 11/2007 | Shudo .......................... 358/1.14 |
| 2008/0034403 | A1 * | 2/2008 | Kakigi .............................. 726/1 |
| 2008/0109662 | A1 * | 5/2008 | Natarajan et al. ............. 713/193 |
| 2008/0144105 | A1 * | 6/2008 | Yagi ............................. 358/1.16 |

(Continued)

FOREIGN PATENT DOCUMENTS

| | | | |
|---|---|---|---|
| JP | 2005-085090 A | 3/2005 |
| JP | 2006-341591 A | 12/2006 |
| JP | 2007-184803 A | 7/2007 |

*Primary Examiner* — Ted Barnes
(74) *Attorney, Agent, or Firm* — Panitch Schwarze Belisario & Nadel LLP

(57) ABSTRACT

The invented image forming apparatus includes an image data production condition production section for producing an image data production condition, an image data output condition production section for producing an image data output condition, and an image data management section for obtaining the image data production condition and the image data output condition in response to an output demand of the image data, for outputting the image data in a case where the image data production condition coincides to the image data output condition, for obtaining a password of the image data in a case where the image data production condition does not coincide to the image data output condition, for outputting the image data in a case where the designated password is entered at a time of image production, and for not outputting the image data in a case where anything other than the designated password is entered at the time of image production. With the invented image forming apparatus, the user's manipulability is much improved as ensuring the security.

9 Claims, 14 Drawing Sheets

(56) References Cited

U.S. PATENT DOCUMENTS

| | | | |
|---|---|---|---|
| 2008/0181650 A1* | 7/2008 | Matsui | 399/80 |
| 2008/0201773 A1* | 8/2008 | Hattori | 726/18 |
| 2008/0288782 A1* | 11/2008 | Iyer | 713/186 |
| 2009/0006747 A1* | 1/2009 | Otsuka | 711/115 |
| 2009/0210941 A1* | 8/2009 | Fusaka | 726/19 |
| 2009/0268238 A1* | 10/2009 | Hanayama | 358/1.15 |
| 2009/0310148 A1* | 12/2009 | Kadowaki | 358/1.6 |
| 2010/0103450 A1* | 4/2010 | Yanazume | 358/1.15 |
| 2010/0271651 A1* | 10/2010 | Kimura | 358/1.14 |
| 2011/0087889 A1* | 4/2011 | Iyer et al. | 713/182 |
| 2011/0128580 A1* | 6/2011 | Kazama | 358/1.15 |
| 2011/0149318 A1* | 6/2011 | Fukada et al. | 358/1.9 |
| 2011/0173444 A1* | 7/2011 | Sato et al. | 713/165 |
| 2011/0194153 A1* | 8/2011 | Takahata | 358/442 |
| 2012/0194580 A1* | 8/2012 | Sasaki | 347/5 |
| 2013/0070284 A1* | 3/2013 | Sakagami et al. | 358/1.14 |

* cited by examiner

FIG. 4

| No. | LOGIN USER NAME (110a) | LOGIN PASSWORD (110b) |
|---|---|---|
| 1 | abe | abc123 |
| 2 | isawa | dfg489 |
| 3 | ueno | kdl430 |
| 4 | eno | jen482 |
| 5 | ota | plw017 |

FIG. 5

| IMAGE DATA IDENTIFICATION NUMBER (111a) | LOGIN USER NAME (111b) | ENCRYPTION PASSWORD (111c) | MAC ADDRESS (111d) |
|---|---|---|---|
| Image0001 | abe | qazx123 | 0103060a0b0c |
| Image0002 | abe | wsxc234 | 0103060a0b0c |
| Image0003 | abe | adcv345 | 0103060a0b0c |
| Image0004 | abe | wsxc234 | 0103060a0b0c |
| Image0005 | ota | thmm567 | 0103060a0b0c |
| Image0006 | eno | plmn987 | 0103060a0b0c |
| Image0007 | isawa | uhbv596 | 0103060a0b0c |

F I G . 9
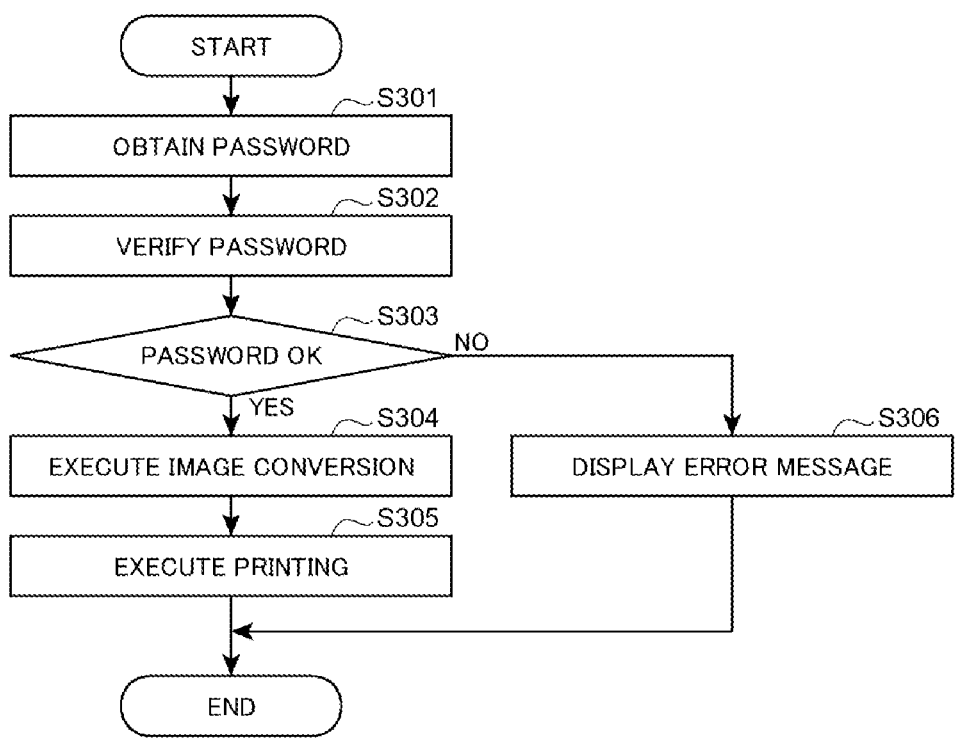

F I G . 1 3
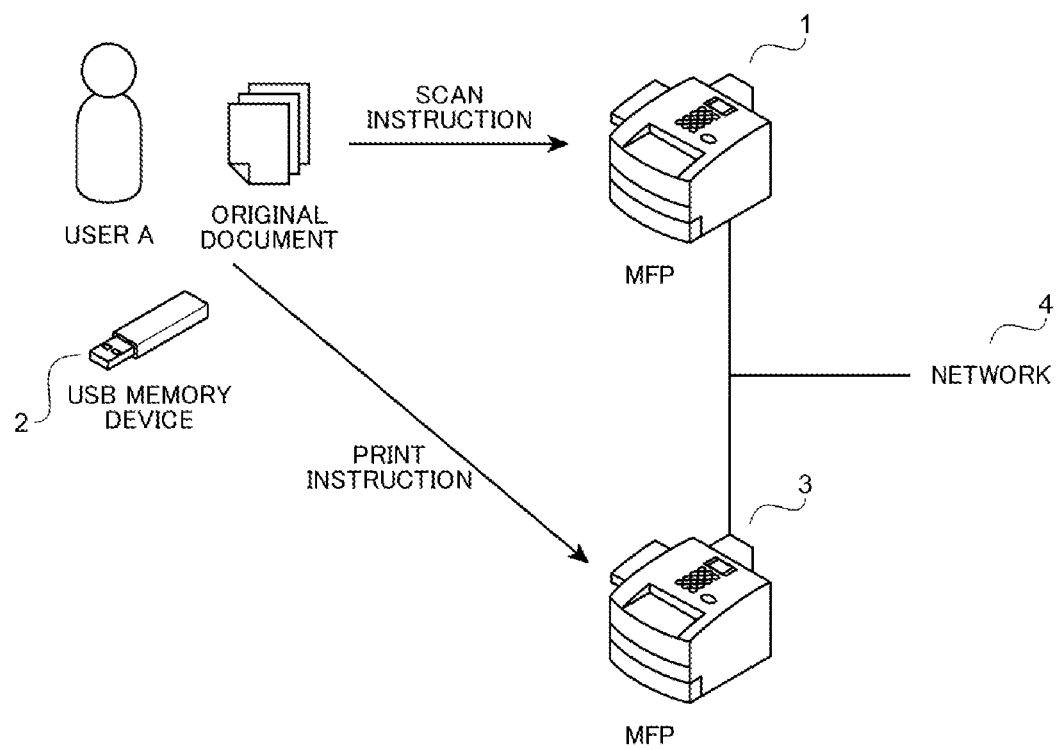

IMAGE FORMING APPARATUS AND IMAGE OUTPUT APPARATUS

BACKGROUND OF THE INVENTION

1. Field of the Invention

This invention relates to an image forming apparatus capable of setting a password for each image data to ensure its security and to an image output apparatus capable of setting a password for each image data to ensure its security.

2. Description of Related Art

Some prior art complex machines, or multifunctional peripherals have a function to produce image data upon scanning original documents or pictures to store the data in a USB (Universal Serial Bus) memory device (hereinafter, called to as "ScanToMemory function"), and a function to print images upon reading out image data from a USB memory without accessing any host computer (hereinafter called to as "Direct-Print function"). Such a multifunctional peripheral may have a function to set a password for each image data and not to output the image data as protection unless the correct password is entered for maintaining the secrecy of the produced image data.

In Japanese Patent Application Publication (KOKAI) No. 2006-341591, for example, a printing apparatus is disclosed in having an identification information setting unit for setting identification information for each printing job and in doing printing processing of the printing job including the identification information coinciding to the identification information based on the printing request in a case where the identification information based on the printing request and the identification information of the printing job stored in a printing job storing unit are compared and found as matched to each other.

With image forming apparatuses in prior art, however, if once a password is set to image data, the password must be entered at each time when the image is outputted, so that there raises a problem that users feel such entries as laborious and far from their satisfaction.

BRIEF SUMMARY OF THE INVENTION

In consideration of technical problems in the prior art, it is an object of the invention to provide an image forming apparatus with improved manipulability at a time of image data output by allowing users to skip entry of the password set during the image production while ensuring its security. It is another object of the invention to provide an image output apparatus with improved manipulability at a time of image data output by allowing users to skip entry of the password set during the image production while ensuring its security.

The foregoing and/or other aspects and utilities of the general inventive concept may be achieved by providing an image forming apparatus according to the invention including a production condition producing unit for producing an image data production condition indicating a production condition for image data, an output condition producing unit for producing an image data output condition indicating an output condition for the image data, a password obtaining unit for obtaining a password for the image data, and an image output unit for obtaining the image data production condition and the image data output condition in response to an output demand of the image data, for outputting the image data in a case where the image data production condition coincides to the image data output condition, for obtaining the password at the password obtaining unit in a case where the image data production condition does not coincide to the image data output condition, for outputting the image data in a case where the designated password is entered at a time of image production, and for not outputting the image data in a case where anything other than the designated password is entered at the time of image production.

The image forming apparatus according to the invention may include an image forming unit for forming an image according to the image data outputted from the image output unit. Such an image forming unit can employ, e.g., an electrophotographic method using an image carrier at which a latent image is developed by toner. The invented image forming apparatus can be used with improved manipulability at a time of image data output thereby allowing users to skip or omit entry of the password set during the image production while ensuring its security.

Furthermore, an image output apparatus according to the invention includes a production condition producing unit for producing an image data production condition indicating a production condition for image data, an output condition producing unit for producing an image data output condition indicating an output condition for the image data, a password obtaining unit for obtaining a password for the image data, and an image output unit for obtaining the image data production condition and the image data output condition in response to an output demand of the image data, for outputting the image data in a case where the image data production condition coincides to the image data output condition, for obtaining the password at the password obtaining unit in a case where the image data production condition does not coincide to the image data output condition, for outputting the image data in a case where the designated password is entered at a time of image production, and for not outputting the image data in a case where anything other than the designated password is entered at the time of image production.

The image output apparatus according to the invention may include an image storing unit for storing an image data according to the image data outputted from the image output unit. The image storing unit can employ an external memory device such as, e.g. a memory card, a USB memory device, an optical recording medium, an external hard disc device, etc. The invented image output apparatus can be used with improved manipulability at a time of image data output thereby allowing users to skip or omit entry of the password set during the image production while ensuring its security.

BRIEF DESCRIPTION OF THE SEVERAL VIEWS OF THE DRAWINGS

The above and other features and utilities of the present general inventive concept will become more apparent by describing in detail exemplary embodiments thereof with reference to the attached drawings in which:

FIG. 4 is a table showing exemplary data of a user management list;

FIG. 5 is a table showing exemplary data of an image data management list;

FIG. 9 is a flowchart for operation in a case that an image production condition and an image output condition for the image subject to an output demand are not matched to each other in the multifunctional peripheral serving as the image forming apparatus according to the first embodiment of the invention;

FIG. 13 is a schematic view showing a general concept of use of an image forming apparatus according to a second embodiment of the invention and other peripheral(s);

DETAILED DESCRIPTION OF THE PREFERRED EMBODIMENTS

Figure 1:
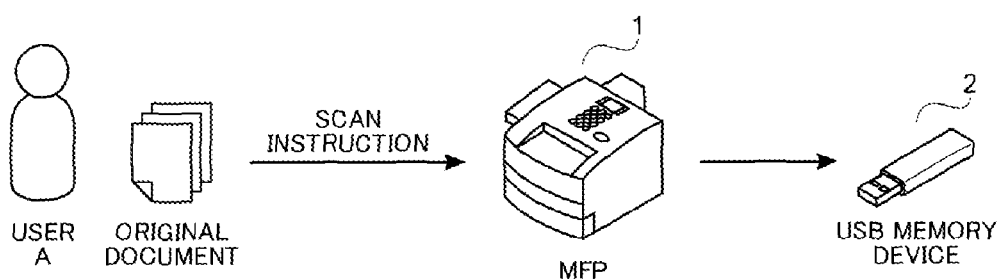
FIG. 1 is a schematic view showing a general concept of use of an image forming apparatus according to a first embodiment of the invention and other peripheral(s)

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures. It is to be noted that the present invention is not limited to the following embodiments and can be appropriately changed without departing from the spirit and scope of the invention.
[First Embodiment]

Figure 2:
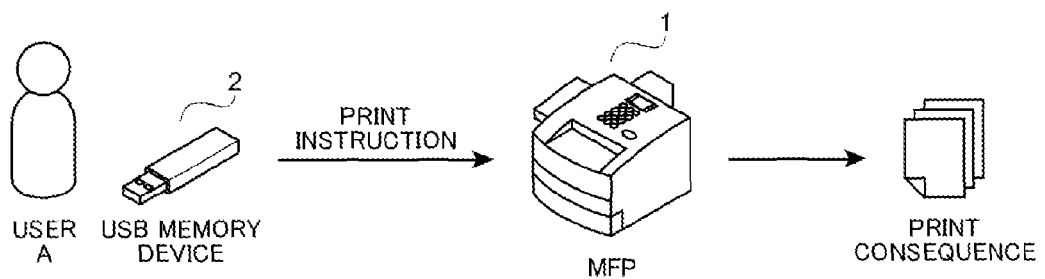
FIG. 2 is a schematic view showing another general concept of use of an image forming apparatus according to the first embodiment of the invention and other peripheral(s)

FIGS. 1, 2 show an image forming apparatus according to a first embodiment of the invention and another peripheral. As shown in FIGS. 1, 2, a multifunctional peripheral 1 serving as the image forming apparatus according to this embodiment is connectable to a USB memory device 2.

The multifunctional peripheral 1 is an image forming apparatus having "ScanToMemory function" and "DirectPrint function" as described above in addition to fundamental functions such as, e.g., printing, facsimile, and photocopying. The USB memory device 2 is a portable recording medium with a built-in flash memory, and is to be plugged into a USB connector and connectable to the multifunctional peripheral 1. The ScanToMemory function is a function to produce image data upon scanning original documents or pictures and to store the data in the USB memory device 2. The DirectPrint function is a function to directly read out image data from the USB memory device 2 without any host computer and print the image. The multifunctional peripheral 1 serving as the image forming apparatus may become an image output apparatus at a time that the multifunctional peripheral 1 performs the ScanToMemory function, which is not requiring any operation to print the image on paper. FIG. 1 shows a use state of ScanToMemory function, while FIG. 2 shows a use state of DirectPrint function.

Although the device to be accessed for ScanToMemory function and DirectPrint function is the USB memory device 2 in this embodiment, such a device to be accessed is not limited to the USB memory device 2 and can be any of other devices such as, e.g., a SD card (or SD memory card), a hard disc, a storage or other device on a server connected via a network.

Figure 3:
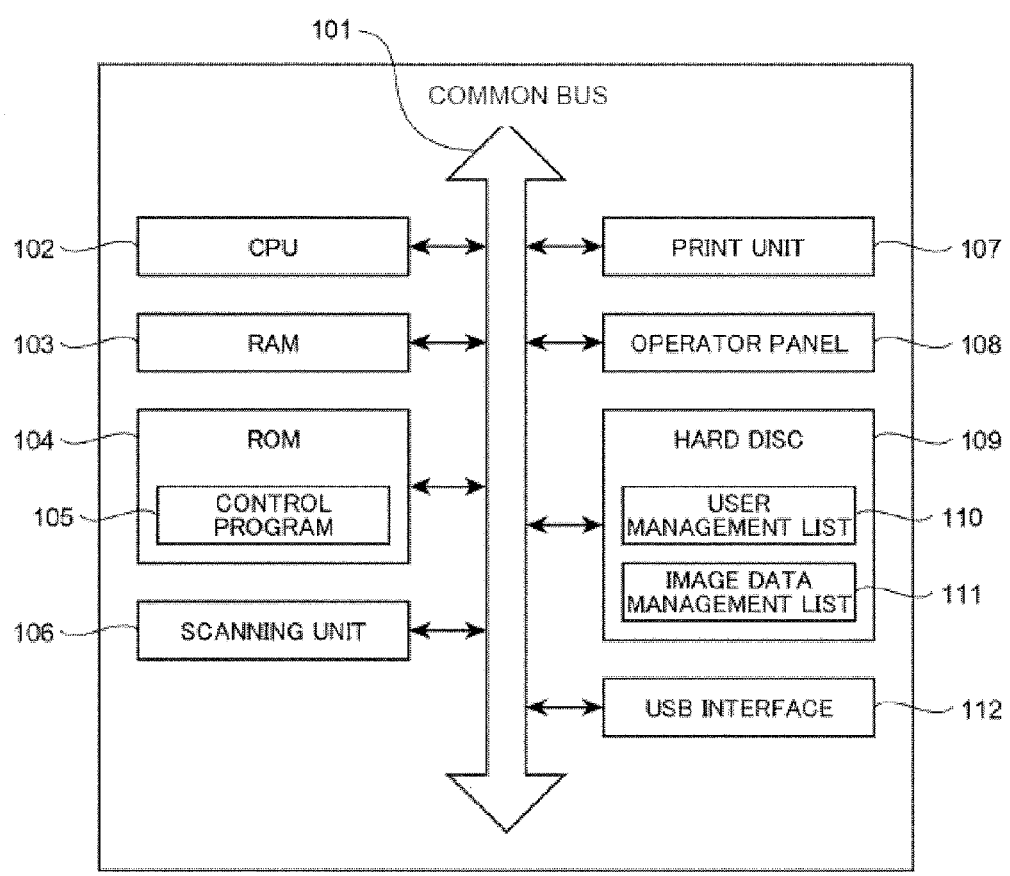
FIG. 3 is a block diagram showing a structure of a multifunctional peripheral serving as the image forming apparatus according to the first embodiment of the invention.

FIG. 3 is a block diagram showing a structure of the multifunctional peripheral 1 serving as the image forming apparatus according to the first embodiment of the invention. As shown in FIG. 3, the multifunctional peripheral 1 includes a common bus 101, a CPU (central processing unit) 102 for controlling the entire device, a RAM (random access memory) 103, a ROM (read only memory) 104 storing at least a control program 105, a scanning unit 106, a print unit 107, an operator panel 108, a hard disc 109 at least storing a user management list 110 and an image data management list 111, and a USB interface 112. Each composition is connected to other mutually via the common bus 101 in a way to make communications arbitrarily. The control program 105 is a program for controlling the multifunctional peripheral 1 as a whole, whose detailed functions are described below with reference to FIG. 6.

The CPU 102 is made of, e.g., a microprocessor, and is a composition controlling the entire multifunctional peripheral 1 by reading out and executing the control program 105 stored in the ROM 104. The RAM 103 is a main memory and is a portion temporarily memorizing necessary information for executing the control program 105. The ROM 104 is a portion storing programs and data including, e.g., the control program 105 for controlling the entire the multifunctional peripheral 1. The scanning unit 106 is a mechanism for emitting light to original documents set on this unit and for picking up drawings and photos by reading light reflected at the original documents with a solid state image sensor such as, e.g., CCD (charge coupled device).

The print unit 107 is a mechanism for actually printing images on paper, including such as, e.g., rollers, a charging device, an exposure device, and a development device. The print unit 107 performs printing in a way of electrophotographic method. The operator panel 108 is a portion serving as a display for notifying the information on the multifunctional peripheral 1 of the users and serving as manipulation input for making entries for users to manipulate the multifunctional peripheral 1. The operator panel 108 also serves as the password obtaining unit. As an input and output mechanism for those portions, a combination of an LCD (liquid crystal display) panel and switches, or an LCD panel of touching type can be used, but the input and output mechanism is not limited to those as a matter of course.

The USB interface 112 is a connecting portion for connecting a USB standard device to the multifunctional peripheral 1. The USB memory device 2 used during the execution of ScanToMemory function and DirectPrint function is also connected to the multifunctional peripheral 1 via this connection portion. The hard disc 109 is a portion to render the data necessary for processing at the multifunctional peripheral 1 perpetually usable, and in this embodiment, the user management list 110 and the image data management list 111 are stored therein.

With reference to FIG. 4, exemplified data of the user management list 110 are illustrated. The user management list 110 is a list for managing information required for identification of users using the multifunctional peripheral 1. In this embodiment, it is assumed that this apparatus is designed to first identify the user to use the multifunctional peripheral 1. The identification of the user is done by entries of a login user name and a login password. As shown in FIG. 4, the user management list 110 memorizes in a corresponding fashion the login user name 110a and the login password 110b of the user of the multifunctional peripheral 1. For example, where the login user name 110a is "abe," the corresponded login password 110b is "abc123", which is memorized.

With reference to FIG. 5, exemplified data of the image data management list 111 are illustrated. The image data management list 111 is a list for managing information of the image data produced with ScanToMemory function at the multifunctional peripheral 1. As shown in FIG. 5, the image data list 111 makes a record of, in a corresponding fashion, an image data identification number 111a for uniquely identifying the image, a login user name 111b for identifying the user producing the image data, a password 111c necessary for encryption and decryption of the concerned image, and a MAC (Media Access Control) address 111d of the multifunctional peripheral 1 producing the image data. For example, regarding the image data identification number 111a of "Image0001", what is recorded in a corresponding fashion is that: the login user name 111b is "abe"; the encryption password 111c is "qazx123"; the MAC address 111d of the multifunctional peripheral 1 is "0103060a0b0c" It is to be noted that the encryption password is a password necessary for encryption and decryption, and in this embodiment, a common password may be used for encryption and decryption, but the invented apparatus is not limited to this.

Figure 6:
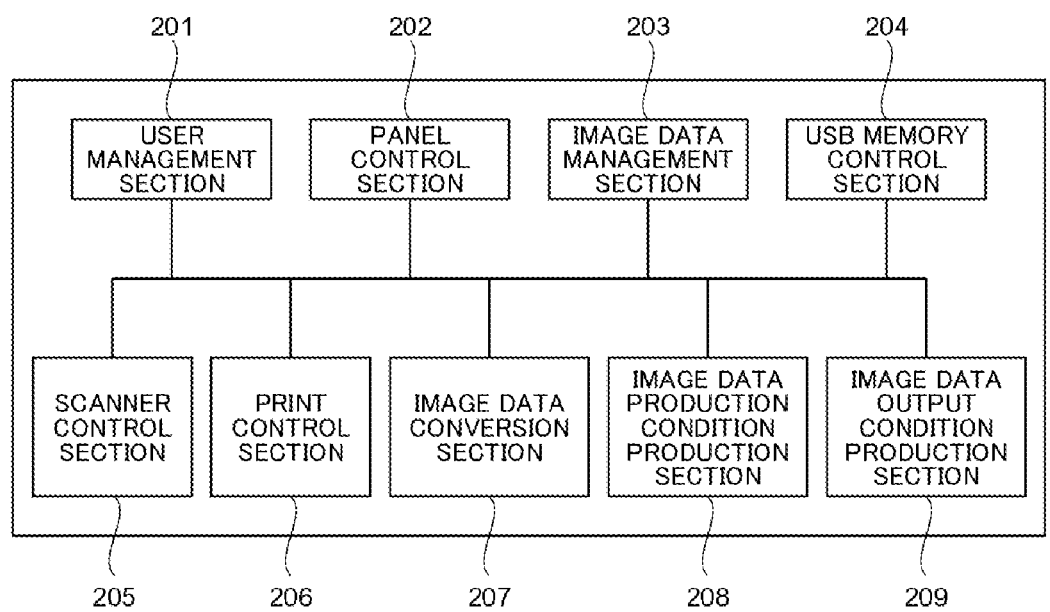
FIG. 6 is a functional block diagram of a control program stored in a ROM of the multifunctional peripheral serving as the image forming apparatus according to the first embodiment of the invention and executed by its CPU.

FIG. 6 shows a functional block diagram of a control program 105 stored in the ROM 104 of the multifunctional peripheral 1 serving as the image forming apparatus according to the first embodiment of the invention and executed by the CPU 102. As shown in FIG. 6, the control program 105 is constituted of a user management section 201, a panel control section 202, an image data management section 203, a USB memory control section 204, a scanner control section 205, a print control section 206, an image data conversion section 207, an image data production condition production section 208, and an image data output condition production section 209.

More specifically, the user management section 201 is a section managing the user management list 110 stored in the hard disc 109, identifying the users of the multifunctional peripheral 1, registering new users, and deleting such registrants. The panel control section 202 is a section controlling the operator panel 108, outputting messages on the operator panel 108, and transmitting signals to respective controllers in the multifunctional peripheral 1 upon pressing down detection of keys arranged on the operator panel 108.

The image data management section 203 is a section for managing information of the image data produced at the multifunctional peripheral 1. This image data management section 203 does renewal operation of the image data management list 111 stored in the hard disc 109 at each production of image data at the multifunctional peripheral 1. The USB memory control section 204 is a section reading data out of and writing data into the USB memory device 2 attached to the USB memory interface 112.

The scanner control section 205 is a section controlling a mechanism for scanning unit 106 and transferring the read image data to other control sections. The print control unit 206 is a section forming images on a medium by controlling the print unit 107 based on the image data outputted from the image data conversion section 207 as described below. The image data conversion section 207 is a section converting data into an encrypted PDF file format upon reception of the image data and the encryption password and converting data into a data format to be outputted at the print unit 107 upon reception of the encrypted PDF file and the encryption password to decrypting the image data.

The image data production condition production section 208 is a section producing the image data production condition. In this embodiment, the image data production condition is defined as a set of three type information constituted of an identifier for uniquely identifying the image to be produced ("Image Serial Number," in this embodiment), a login user name of the user instructing the production of the image data, and a MAC address for uniquely identifying the multifunctional peripheral 1 producing the image data.

The image data output condition production section 209 is a section producing the image data output condition. In this embodiment, the image data production condition is defined as a set of three type information constituted of an identifier for uniquely identifying the image obtained from a header portion of the image data demanded to be outputted ("Image Serial Number," in this embodiment), a login user name of the user instructing the output of the image data, and a MAC address for uniquely identifying the multifunctional peripheral 1 outputting the image data.

Figure 7:
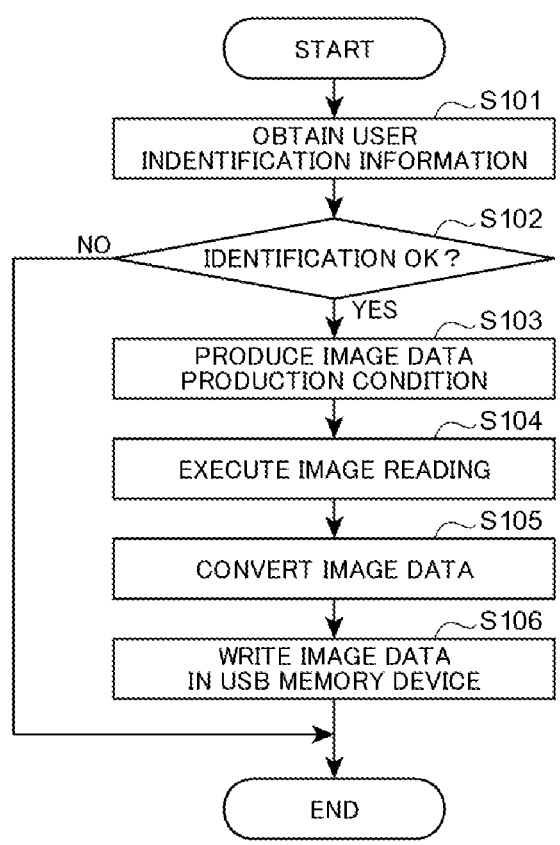
FIG. 7 is a flowchart for describing operation to write image data to a USB memory device with ScanToMemory function of the image forming apparatus according to the first embodiment of the invention.

Hereinafter, with reference to the flowcharts in FIGS. 7 to 9, the image forming apparatus as well as the image output apparatus according to the first embodiment of the invention are described. First of all, the operation of the multifunctional peripheral 1 serving as the image output apparatus, where the multifunctional peripheral 1 writes image data into the USB memory device 2 with the ScanToMemory function, will be described in referring to FIG. 7.

The panel control section 202 informs the user management section 201 of the user identification information, or namely the login user name entered by the user with the operator panel 108, and the information of the login password. The user management section 201 obtains the user identification information with this operation. The user management section 201 identifies the user in use of the information of the user management list 110 managed by itself and the login user name as well as the login password as the received user identification information (S102).

As a consequence of the identification done by the user management section 201, if the user is registered at the multifunctional peripheral 1, the identification is made successful, and the user management section 201 notifies the panel control section 202 of that this user is the registrant. The operation goes to step S103. To the contrary, if the user is not registered at the multifunctional peripheral 1 as the consequence of the identification, the identification is made unsuccessful, and the user management section 201 displays via the panel control section 202 a message that this user is not the registrant of the multifunctional peripheral 1 and therefore not allowed to use the multifunctional peripheral 1, and ends the processing (S102).

Subsequently, upon reception of an execution demand of ScanToMemory function from the user, the panel control section 202 notifies the image data management section 203 of the reception of the execution demand. The image data management section 203 displays on the operator panel 108 a message to prompt an entry of an encryption password for encrypting the image data. The image data management section 203 also demands production of the image data production condition to the image data production condition production section 208. The image data production condition production section 208 numbers the image data identification number upon reception of that demand, and notifies the image data management section 203 of the login user name of the user obtained from the user management section 201 and the MAC address of the multifunctional peripheral 1 as the image data production condition. The image data management section 203 makes corresponding between the image data production condition notified from the image data production condition production section 208 and the encryption password for encrypting the image data which the user enters with the operator panel 108, and memorizes in the image data management list 111 stored in the hard disc 109 (S103).

Next, the operation executes image reading. That is, the panel control section 202 notifies the image data management section 203 and the scanner control section 205 of a reading start instruction provided from the user. The image data management section 203 sets the image data identification number, the encryption password of the image data, and the MAC address of the multifunctional peripheral 1 to the image data conversion section 207. The scanner control section 205 controls the scanning unit 106 to read the original documents set on the scanning unit 106 and to transfer the data to the image data conversion section 207 (S104).

The image data conversion section 207 subsequently converts the image data. That is, the image data conversion section 207 produces a PDF file encrypted using the preset encryption password of the image data, adds the image data identification number and the MAC address to the header portion of the image data, and transfers the data to the USB memory interface 112 (S105).

The USB memory interface 112 subsequently writes the received image data, or namely the encrypted PDF, into the USB memory device 2, notifies the operator panel 108 of this writing at a completion of writing (S106), and ends the series of operations in such a way.

Figure 8:
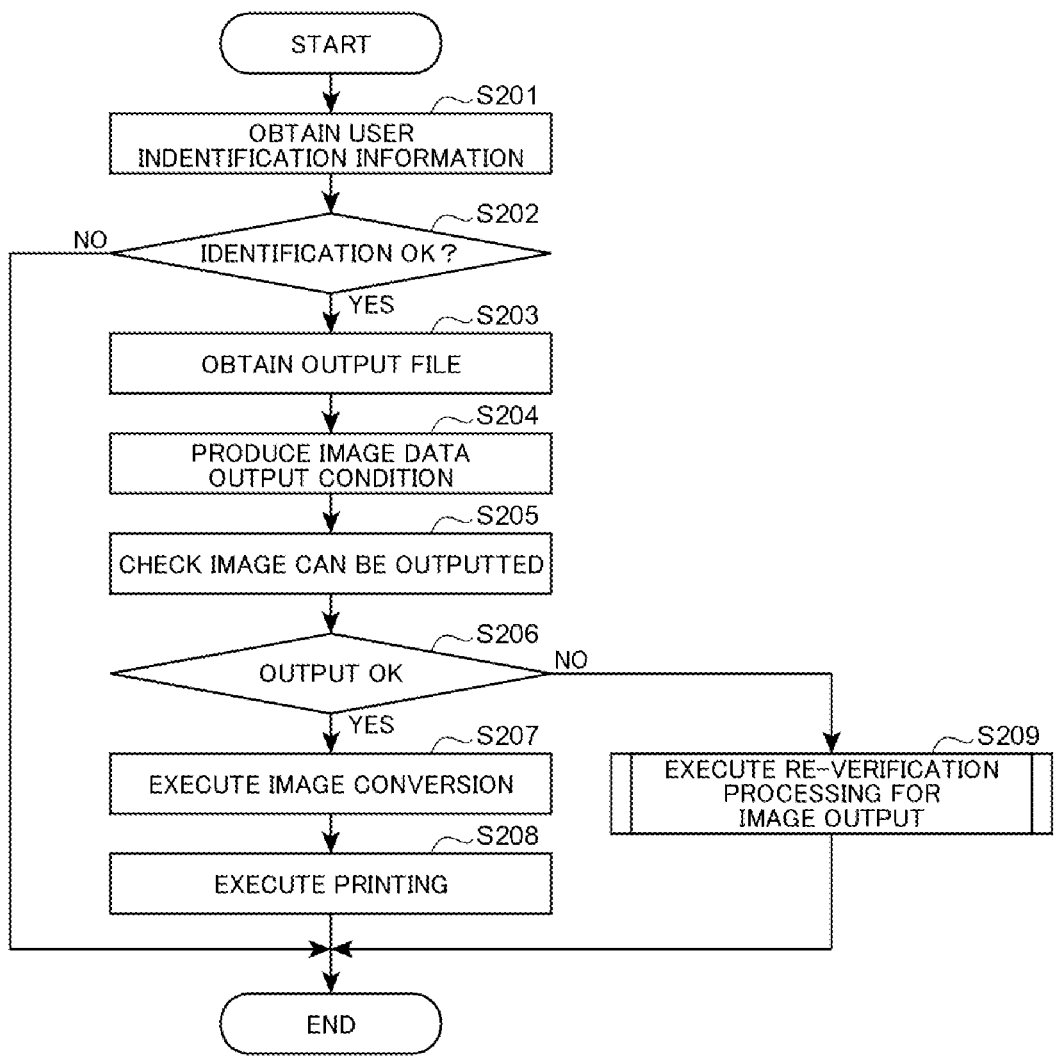
FIG. 8 is a flowchart for describing operation to print image data written in the USB memory device with DirectPrint function of the image forming apparatus according to the first embodiment of the invention.

Referring to FIG. 8, operation of the multifunctional peripheral 1 serving as an image forming apparatus according to the first embodiment where the multifunctional peripheral 1 prints image data written in the USB memory device 2 with DirectPrint function.

The panel control section 202 notifies the user management section 201 of the user identification information, namely, the login user name that the user enters with the operator panel 108, and the information of the login password. With this information, the user management section 201 acquires the user identification information. The user management section 201 identifies the user using the user management list 111 which is stored in the hard disc 109 and managed by itself, the received login user name, and the login password (S201).

As a consequence of the identification operation done at the user management section 201, if the user is registered in the multifunctional peripheral 1, the identification is made successful, and the user management section 201 notifies the panel control section 202 of that this user is the registrant and renders the operation proceed to step S203. To the contrary, if the user is not registered in the multifunctional peripheral 1 as a consequence of the identification operation, the identification is made unsuccessful, and the user management section 201 displays, via the panel control section 202, that this user is not the registrant of the multifunctional peripheral 1 and is not allowed to use the multifunctional peripheral 1. The user management section 201 renders the operation end (S202).

The panel control section 202 subsequently displays a list of files stored in the USB memory device 2 on the operator panel 108, and obtains the information of the image data to be printed with DirectPrint function to provide a notice to the image data management section 203. That is, the image data management section 203 obtains an output file (S203).

The image data output condition production section 209 produces the image data output condition. That is, the image data management section 203 demands the image data output condition production section 209 to produce the image data output condition. The image data output condition production section 209 reads out the image data identification number and the MAC address of the multifunctional peripheral 1 used at a time of the image formation from the header information of the image data demanded to be printed. The image data output condition production section 209 obtains from the user management section 201 the login user name of the user currently demanding output of the image data, and notifies the image data management section 203 of the image data output condition, which is made together with the login user name and with the previously obtained image data identification number and MAC address of the multifunctional peripheral 1 (S204).

The image data management section 203 checks out as to whether there is any coincidence between the image data output condition notified from the image data output condition production section 209 and the image data production condition recorded in the image data management list 111 stored in the hard disc 109 and managed by itself. That is, the image data management section 203 verifies whether the image is to be outputted (S205).

The image data management section 203 executes re-verification processing for image output if no image data production condition identical to the image data output condition is found (proceeding to "No" at step S206). The re-verification processing for image output is described later using FIG. 9, and such a description is omitted in this flowchart.

The image data management section 203 reads out the encryption password of the image data from the image data management list 111 to print the concerned image data if finding the image data production condition identical to the image data output condition (proceeding to "Yes" at step S206). The image data management section 203 sets the encryption password to the image data conversion section 207 and reads out the image data to be printed from the USB memory device 2 through the USB memory control section 204 to transfer the data to the image conversion section 207 as proceeding to step S207.

The image data conversion section 207 decrypts the received image data with the preset decryption password and transfers the data to the print control section 206 upon converting the data into data in a format that the print unit 107 can output. That is, the image data conversion section 207 executes image conversion (S207).

The print control section 206 forms images on a medium as controlling the print unit 107 (S208). Although in this embodiment, "printing" operation is exemplified as an output method of the image data read out of the USB memory device 2 for the sake of more simplified explanation, the output methods are not limited to printing, and can include other output methods such as, e.g., mail transmission, server transmission, and facsimile transmission, as a matter of course. Thus, a series of operations is completed.

Next, with reference to FIG. 9, detailed processing in a case that the image production condition of the image demanded to be outputted does not coincide to the image output condition is described. In other words, the re-verification processing for image output, which is executed at step S209 in FIG. 8, is described in detail.

The image data management section 203 displays a message prompting an entry of the password to be used for decryption of the image data and requests to the user the entry of the password for decryption of the image data, thereby receiving the password (S301).

The image data management section 203 verifies the password. That is, the image data management section 203 sets the password for decryption of the image data entered with the operator panel 108 to the image data conversion section 207, and transfers the image data to be printed to the image data conversion section 207 via the USB memory control section 204 upon reading out of the USB memory device 2 (S302).

The image data conversion section 207 decrypts the received image data with the preset decryption password. If the image data are properly decrypted with the preset decryption password (proceeding to "Yes" at step S303), the operation proceeds to step S304, and the image data conversion section 207 transfers the decrypted image data to the print control section 206 upon converting the data into a format that the print unit 107 can output (S304). The print control section 206 forms images on a medium in controlling the print unit 107 (S305), and ends this processing.

To the contrary, if the decryption is made improper (proceeding to "No" at step S303), the operation proceeds to step S306, and the image data management section 203 displays that the image data decryption password entered with the operator panel 108 are improper (S306). This processing then ends.

It is to be noted that, as a judgment method as to whether the decryption is proper, there are methods to judge it with a criteria as to whether a fixed string can be read out of a certain place of the decrypted image data where the fixed string is previously embedded in the certain place of the image data, but any method known to the person skilled in the art can be used, and no specific method is referred in this embodiment.

Figure 10:
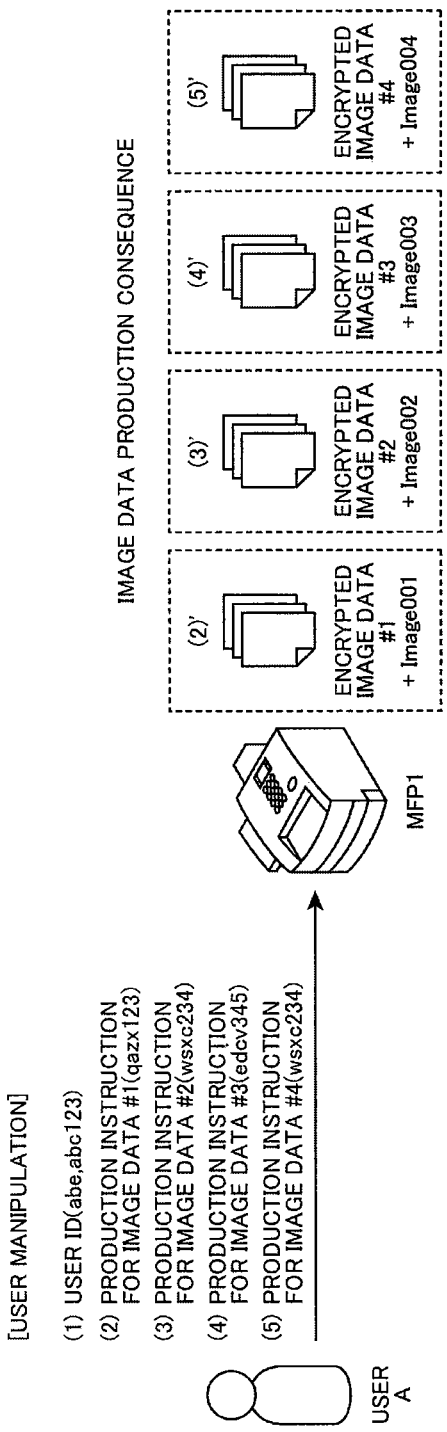
FIG. 10 is a diagram illustrating manipulations that a user does for the multifunctional peripheral and what difference occurs in the output result between in a case that an image production condition and an image output condition are matched to each other and in a case that those are not matched.
Figure 11:
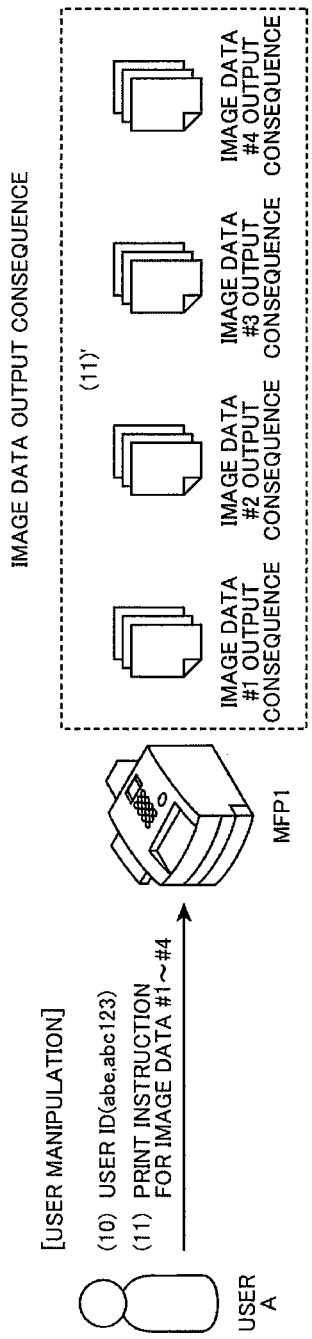
FIG. 11 is a diagram illustrating manipulations that a user does for the multifunctional peripheral and what difference occurs in the output result between in a case that an image production condition and an image output condition are matched to each other and in a case that those are not matched.
Figure 12:
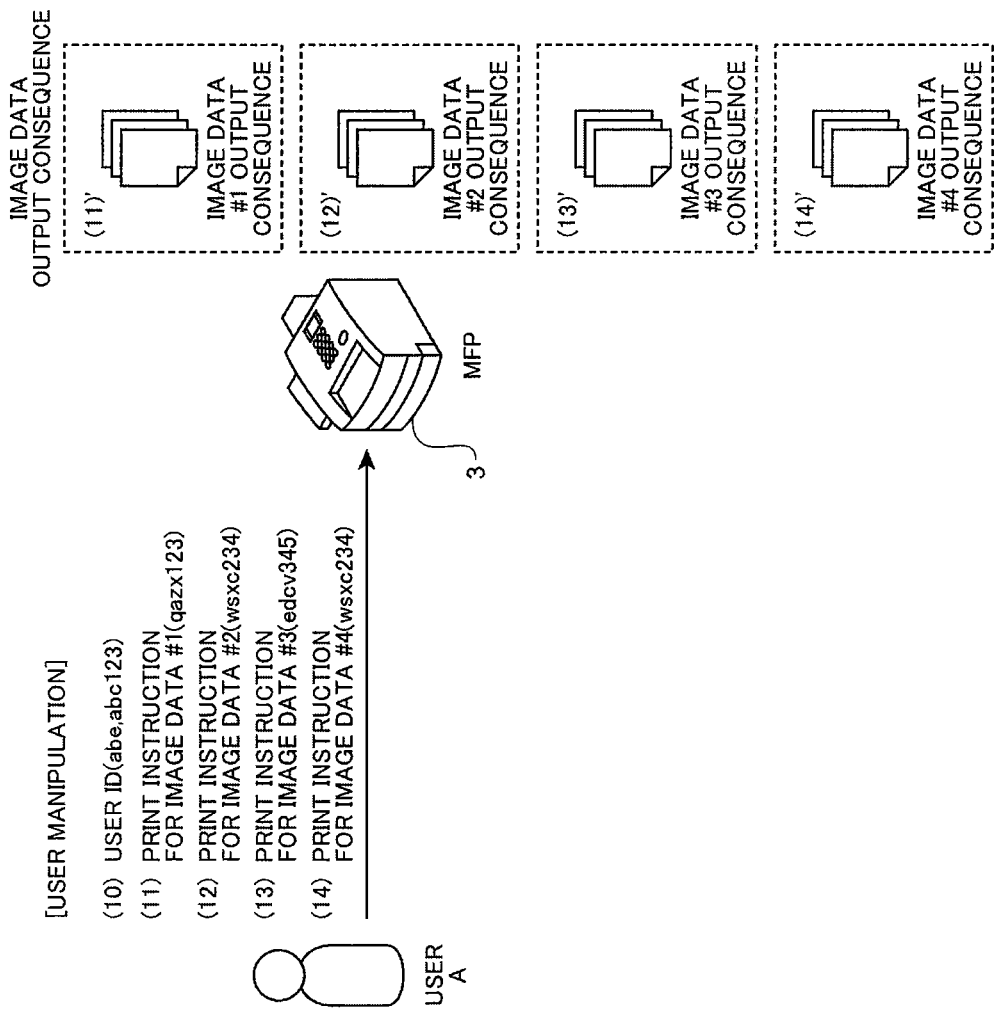
FIG. 12 is a diagram illustrating manipulations that a user does for the multifunctional peripheral and what difference occurs in the output result between in a case that an image production condition and an image output condition are matched to each other and in a case that those are not matched.

With reference to FIG. 10 to FIG. 12, what differences occur in the output consequences and the manipulations that the user performs for the multifunctional peripheral 1 between in a case where the image data production condition coincides to the image data output condition and in a case where the image data production condition does not coincide to the image data output condition, is described.

First, FIG. 10 shows user manipulations and output consequences where user A produces four image data utilizing ScanToMemory function of the multifunctional peripheral 1, where the login user name is "abe," and the login password is "abc123," and where the passwords at the time encrypting the image data are "qazx123" for image data #1, "wsxc234" for image data #2, "edcv345" for image data #3, and "wsxc234" for image data #4. The numbers in the parenthesis indicate the manipulation order of the user, and the numbers in a parenthesis with an apostrophe indicate the output consequences of the multifunctional peripheral 1 done by the manipulation order according to the user's manipulation indicated by the numbers in the parenthesis. That is, in FIG. 10, it is shown that the multifunctional peripheral 1 outputs one encrypted image data for each time of image data production demands made by user A. It is to be noted that in this specification, the encrypted image data are like encrypted PDF files but not limited to those.

FIG. 11 shows operation of the multifunctional peripheral 1 at a later time where user A prints four image data utilizing DirectPrint function for the same multifunctional peripheral 1. In this situation, because the image data production condition coincides to the image data output condition, the multifunctional peripheral 1 does not require any entry of the password for decrypting the image data by the printing instruction of image data for one time and can successively output the image data #1 to #4.

On the other hand, FIG. 12 shows operation of the multifunctional peripheral 1 at a later time where user A reprints four image data utilizing DirectPrint function for another multifunctional peripheral 3. In this situation, because the image data production condition does not coincide to the image data output condition, or namely because of mismatching of the MAC addresses, it means that the user is required to enter image printing instructions and passwords four times to print the four image data.

It is to be noted that where another user B does reprinting of the image data utilizing DirectPrint function of the multifunctional peripheral 1, the steps shown in FIG. 12 are required because the image data production condition does not coincide to the image data output condition, or namely because of mismatching of the login user names.

According to the first embodiment as described above, the image forming apparatus is provided in including an image data production condition production section 208 serving as a production condition producing unit for producing an image data production condition, an image data output condition production section 209 serving as an output condition producing unit for producing an image data output condition, a password obtaining unit for obtaining a password for the image data, and an image data management section 203 serving as an image output unit for obtaining the image data production condition and the image data output condition in response to an output demand of the image data, for outputting the image data in a case where the image data production condition coincides to the image data output condition, for obtaining the password at the password obtaining unit in a case where the image data production condition does not coincide to the image data output condition, for outputting the image data in a case where the designated password is entered at a time of image production, and for not outputting the image data in a case where anything other than the designated password is entered at the time of image production.

As the image data production condition, the MAC address of the multifunctional peripheral 1 executing production processing of the image data can be used, and as the image data output condition, the MAC address of the multifunctional peripheral 1 which is going to output the image data can be used. Alternatively, as the image data production condition, the login user name as the identification information at a time that the user who demands the image production logs in to the multifunctional peripheral 1, can be used, and as the image data output condition, the login user name as the identification information at a time that the user who demands the image output logs in to the multifunctional peripheral 1, can be used. Further alternatively, as the image data production condition, a set of an identifier for uniquely identifying an image to be produced, identification information at a time that the user who demands the image production logs in to the multifunctional peripheral 1, and a MAC address for uniquely identifying the multifunctional peripheral 1 producing the image data, can be used, and as the image data output condition, a set of an identifier for uniquely identifying an image obtained from the header portion of the image data demanded to be outputted, the login user name serving as identification information at a time that the user who instructs the image output logs in to the multifunctional peripheral 1, and a MAC address for uniquely identifying the multifunctional peripheral 1 which is going to output the image data, can be used.

Thus, with the image forming apparatus according to the invention, where the image data production condition coincides to the image data output condition, the image can be outputted without user's any entry of any password set at the image production, so that this invented apparatus can improve manipulability at a time of image data output while ensuring the security.

[Second Embodiment]

FIG. 13 shows a general concept of use of the second embodiment of the invention. Hereinafter, duplicated explanation is omitted upon providing the common reference numbers in the first embodiment to the common portions in the first embodiment, and differences are mainly described. The difference from the use described in the first embodiment is a point that the multifunctional peripheral 1 is connected to plural multifunctional peripherals 3 via a network 4. The network 4 is a communication route connected between the multifunctional peripheral 1 and the multifunctional peripherals 3. It is as a matter of course that the communication route can be exemplified in having a structure using a wireless LAN or the like, other than such a network.

Figure 14:
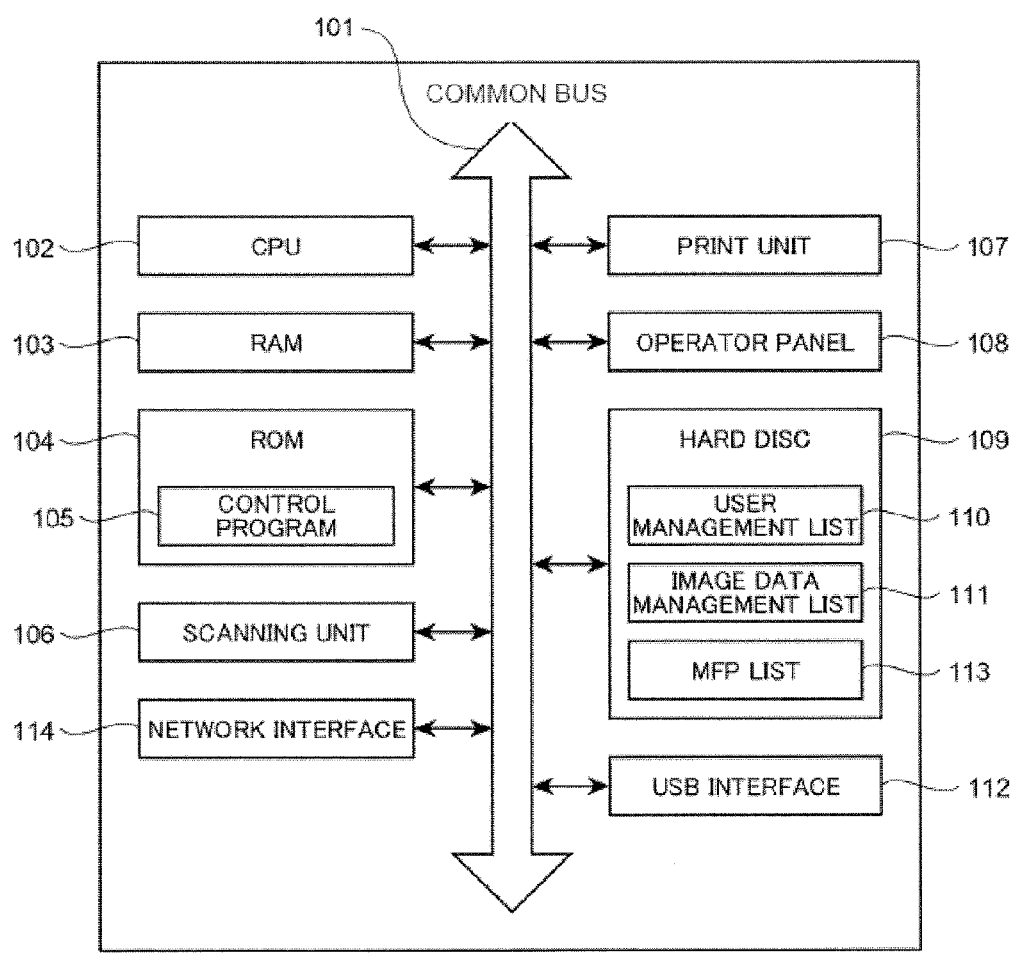
FIG. 14 is a block diagram showing a structure of a multifunctional peripheral serving as the image forming apparatus according to the second embodiment of the invention.

FIG. 14 is a block diagram showing the multifunctional peripheral 1 serving as the image forming apparatus according to the second embodiment of the invention. The differences from the first embodiment are that a multifunctional peripheral list 113 is added in the hard disc 109 and that a network interface 114 is added. The network interface 114 is a communication route of the multifunctional peripheral 1 for transmitting and receiving the image data management list 110 via the network 4 in communication with other multifunctional peripherals 3.

Figures 15, 16:
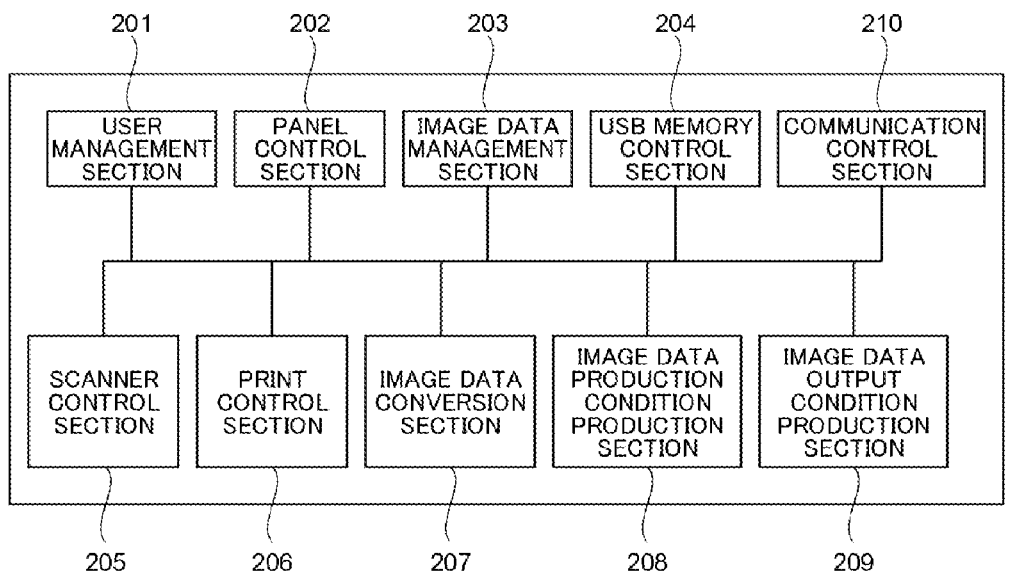
FIG. 15 is a table showing exemplary data of a multifunctional peripheral list.
FIG. 16 is a functional block diagram of a control program of the multifunctional peripheral serving as the image forming apparatus according to the second embodiment of the invention.

FIG. 15 illustrates a data example of the multifunctional peripheral list 113. As shown in FIG. 15, the multifunctional peripheral list 113 is a list storing MAC addresses 115*a* of such as, e.g., other multifunctional peripherals 3 to be searched at a time when the multifunctional peripheral 1 searches the image data production condition. The image data management section 203 makes a search on the image data management list 110 owned by other functional peripherals set forth on this list, as other than the image data management list 110 owned by itself.

FIG. 16 is a function block diagram of the control program 105 of the multifunctional peripheral 1 as the image forming apparatus according to the second embodiment. The difference from the first embodiment described above is that the communication control section 210 is added. The communication control section 210 is a section to control the network interface 114 and to execute transmitting and receiving processing of the image data management list 110 with other multifunctional peripherals.

Figure 17:
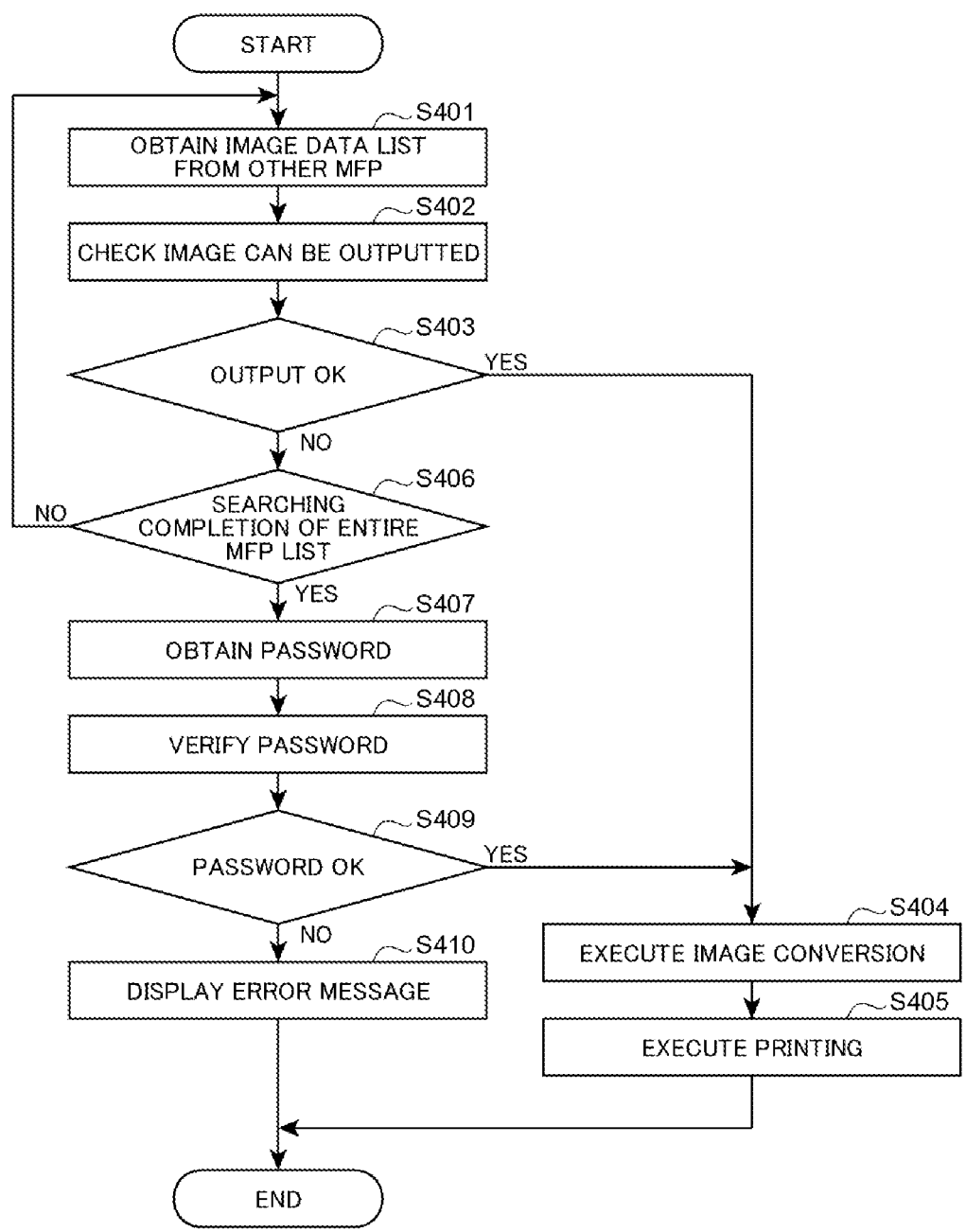
FIG. 17 is a flowchart for operation in a case that an image production condition and an image output condition for the image subject to an output demand are not matched to each other.

With reference to FIG. 17, above-described processing contents different from the operation of the first embodiment only are herein described because the operation of the multifunctional peripheral 1 in the second embodiment is substantially the same as that in the first embodiment described using FIG. 8 and FIG. 9 except the processing in a case that the image production condition of the image demanded to be outputted does not coincide to the image output condition (step S209 in FIG. 8).

Hereinafter with reference to the flowchart in FIG. 17, the processing in a case that the image production condition of the image demanded to be outputted does not coincide to the image output condition, is described in detail. That is, re-verification processing for image output is described in detail.

The image data management section 203 looks up the multifunctional peripheral list 113, obtains the MAC addresses of the multifunctional peripherals as a searching destination of the image data production condition, and obtains the image data management list 110 of the multifunctional peripherals having the obtained MAC addresses (S401).

The image data management section 203 subsequently verifies as to whether the image can be outputted. That is, the image data management section 203 searches as to whether the image data identification number of the image data currently demanded to be outputted exists in the obtained image data management list 110, and, if finding the same image data identification number, subsequently compares the login user name at the time of the image data production with the login user name of the user who is currently about to output the image data (S402).

The image data management section 203 then obtains the password for decryption of the image data from the image data management list 110 if the image data identification number and the user login information coincide respectively (proceeding to "Yes" at step S403), sets the data in the image data conversion section 207, and transfers the image data to be printed to the image data conversion section 207 via the USB memory section 204 upon being read out of the USB memory device 2 (proceeding to step S404).

The image data conversion section 207 checks whether the image data received first is decrypted, and if the data are not decrypted, transfers the data to the print control section 206 upon converting the data into a format that can be outputted at the print unit 107 after the image data are decrypted with the preset decryption password. If the received image data are already decrypted, the image data conversion section 207 directly transfers the data to the print control section 206 upon converting the data into a format that can be outputted at the print unit 107 (S404). It is to be noted that in this embodiment, the judgment as to whether the image data are decrypted is done by substantially the same method as the verifying method as to whether decryption is proper described in the first embodiment. Subsequently, the print control section 206 controls the print unit 107 and forms the images on a medium, or namely executes printing (S405), thereby ending the operation.

To the contrary, in a case where the image data identification number of the image data demanded to be outputted does not exist in the obtained image data management list 110, or where the user login information is not matched, the operation proceeds to step S406. It is to be noted that, in this embodiment, it is described that coincidence between the MAC address of the multifunctional peripheral at a time of the image production and the MAC address of the multifunctional peripheral at a time of the image output is to be neglected.

The image data management section 203 repeats the operations at steps S401 to S403 until the searching completion of the entire multifunctional peripherals in the multifunctional peripheral list 113. If the search ends (proceeding to "Yes" at step S406), upon proceeding to step S407, the image data management section 203 displays on the operator panel 108 a message to prompt an entry of a decryption password for decrypting the image data, and demands an entry of the password to the user. That is, the password is obtained (S407).

The image data management section 203 verifies the password. That is, The image data management section 203 sets the password for decryption of the image data entered from the operator panel 108 in the image data conversion section 207, and transfers the image data to be printed to the image data conversion section 207 via the USB memory section 204 upon being read out of the USB memory device 2 (step S408).

The image data conversion section 207 decrypts the received image data with the preset decryption password. If the image data is properly decrypted with the given decryption password (proceeding to "Yes" at step S409), the operation goes to step S404, and if the data is not properly decrypted (proceeding to "No" at step S409), the operation goes to step S410. The image data management section 203 displays on the operator panel 108 a message that the entered decryption password for the image data is improper (S410), thereby ending the series of operations.

As described above, according to the second embodiment of the invention, an image forming apparatus is provided in having, as a feature, the communication control section 210 serving as the image production condition production unit for obtaining the image data production condition from other previously designated multifunctional peripherals 3 in a case where the image data production condition of the image data demanded to be outputted is not successfully obtained.

The multifunctional peripherals 3 as other image forming apparatuses are managed at the multifunctional peripheral list 113 serving as the certain list, and the MAC addresses of the multifunctional peripherals 3 and the login user name as identification information at a time that the user who demands output logs in to the concerned multifunctional peripherals 3 may be obtained as the image data production condition of the multifunctional peripherals 3 serving as other image forming apparatuses set forth in the multifunctional peripheral list 113.

According to the second embodiment, the password entry can be omitted at any peripheral other than the multifunctional peripheral producing the image data, so that the user's manipulability is much improved as ensuring the security in the systems and apparatuses.

Although in embodiments described above, the multifunctional peripheral is exemplified, this invention is applicable to other image forming apparatuses as well as other image output apparatuses, such as, e.g., printers, photocopiers, facsimile machines, scanners.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus comprising:
    an acquisition unit configured to acquire first data;
    a writing unit configured to write to an external memory medium the first data contemporaneously with apparatus identification information identifying the image forming apparatus,
    wherein the external memory medium stores the first data written at the writing unit and second data not associated with the apparatus identification information;
    an operating unit configured to receive a processing instruction with respect to the first data or the second data written in the external memory medium; and
    a processing unit configured to judge whether or not the apparatus identification information is associated with the first data when the operating unit receives the processing instruction with respect to the first data, the processing unit performing a processing with respect to the first data written in the external memory medium based on a judgment result that the apparatus identification information is associated with the first data, and
    the processing unit being further configured to judge whether or not the apparatus identification information is associated with the second data when the operating unit receives the processing instruction with respect to the second data, the processing unit restricting the processing with respect to the second data written in the external memory medium based on the judgment result that the apparatus identification information is not associated with the second data.

2. The image forming apparatus according to claim 1, wherein the apparatus identification information is a MAC address of the image forming apparatus.

3. The image forming apparatus according to claim 1, further comprising:
    a memory unit configured to store data identification information for identifying the first data,
    wherein the writing unit associates the data identification information with the first data, and writes the data identification information and the first data in the external memory medium,
    wherein the processing unit, when the operating unit receives the processing instruction with respect to the first data, judges whether or not the data identification information written in the external memory medium and the data identification information stored in the memory unit correspond to each other, and whether or not the apparatus identification information is associated with the first data, the processing unit performing the processing with respect to the first data written in the external memory medium based on the judgment result that the apparatus identification information is associated with the first data.

4. The image forming apparatus according to claim 1, further comprising:
    a password reception unit configured to receive an input of a first password;
    a conversion unit configured to encrypt the first data acquired at the acquisition unit based on the first password received at the password reception unit,
    wherein the writing unit associates the encrypted first data together with the apparatus identification information, and writes the encrypted first data and the associated apparatus identification information in the external memory medium; and
    a password memory unit configured to store the first password received at the password reception unit,
    wherein the processing unit, when the operating unit receives the processing instruction with respect to the first data, judges whether or not the apparatus identification information is associated with the first data, based on the judgment result that the apparatus identification information is associated with the first data, the processing unit decrypting the first data based on the first password stored in the password memory unit, and performs the processing with respect to the decrypted first data.

5. The image forming apparatus according to claim 4, wherein the second data written in the external memory medium is encrypted, and
wherein the processing unit, when the operating unit receives the processing instruction with respect to the second data, allows the password reception unit to receive an input of a second password, and decrypts the second data based on the received second password, and performs a processing with respect to the decrypted second data.

6. The image forming apparatus according to claim 4, further comprising:
another apparatus identification information memory unit configured to store another apparatus identification information identifying another image forming apparatus,
wherein the processing unit, when the operating unit receives the processing instruction with respect to the second data, judges whether or not the apparatus identification information is associated with the second data, the processing unit obtains the second password from the another image forming apparatus identified by the another apparatus identification information stored in the another apparatus identification information memory unit based on the judgment result that the apparatus identification information is not associated with the second data, and decrypts the second data based on the second password obtained, and performs the processing with respect to the decrypted second data.

7. The image forming apparatus according to claim 1, wherein the first data is image data, and the second data is image data.

8. The image forming apparatus according to claim 1, wherein the acquisition unit is a scanner.

9. An image forming apparatus comprising:
an acquisition unit configured to acquire first data and second data;
a writing unit configured to write the first data and first association information in an external memory medium and to write the second data and second association information in the external memory medium,
wherein the first association information includes apparatus identification information identifying the image forming apparatus, the first association information being information for associating the first data and the apparatus identification information, and the second association information includes the apparatus identification information, the second association information being information for associating the second data and the apparatus identification information;
an operating unit configured to receive a processing instruction with respect to the first data or the second data written in the external memory medium;
a processing unit configured to judge whether or not the apparatus identification information included in the first association information written in the external memory medium and the apparatus identification information of the image forming apparatus correspond to each other when the operating unit receives the processing instruction with respect to the first data, and if there is a correspondence, the processing unit performs a processing with respect to the first data written in the external memory medium, and if there is no correspondence, the processing unit restricts the processing with respect to the first data written in the external memory medium,
the processing unit being further configured to judge whether or not the apparatus identification information included in the second association information written in the external memory medium and the apparatus identification information of the information processing apparatus correspond to each other when the operating unit receives the processing instruction with respect to the second data, and if there is a correspondence, the processing unit performs the processing with respect to the second data written in the external memory medium, and if there is no correspondence, the processing unit restricts the processing with respect to the second data written in the external memory medium;
a password reception unit configured to receive an input of a first password and an input of a second password;
a conversion unit configured to encrypt the first data acquired at the acquisition unit based on the first password received at the password reception unit and encrypt the second data acquired at the acquisition unit based on the second password received at the password reception unit,
wherein the writing unit writes the encrypted first data together with the encrypted second data in the external memory medium in association with each other,
a password memory unit configured to store the first and the second passwords received at the password reception unit,
wherein the processing unit, when the operating unit receives the processing instruction with respect to the first data, judges whether or not the apparatus identification information included in the first association information written in the external memory medium and the apparatus identification information of the image forming apparatus correspond to each other, and if there is a correspondence, the processing unit decrypts the first data based on the first password stored in the password memory unit, and performs the processing with respect to the decrypted first data,
wherein the processing unit, when the operating unit receives the processing instruction with respect to the second data, judges whether or not the apparatus identification information included in the second association information written in the external memory medium and the apparatus identification information of the image forming apparatus correspond to each other, and if there is a correspondence, the processing unit decrypts the second data based on the second password stored in the password memory unit, and performs the processing with respect to the decrypted second data; and
another apparatus identification information memory unit configured to store apparatus identification information of another image forming apparatus,
wherein the processing unit, when the operating unit receives the processing instruction with respect to the first data, judges whether or not the apparatus identification information included in the first association information written in the external memory medium and the apparatus identification information of the image forming apparatus correspond to each other, and if there is no correspondence, the processing unit obtains the password from the another image forming apparatus indicated with the apparatus identification information stored in the another apparatus identification information memory unit, and decrypts the first data based on the password obtained, and performs the processing with respect to the decrypted first data, and wherein the processing unit, when the operating unit receives the processing instruction with respect to the second data, judges whether or not the apparatus identification information included in the second association information written in the external memory medium and the apparatus identification information of the image forming apparatus correspond to each other, and if there is no correspondence, the processing unit obtains the password from the another image forming apparatus indicated with the apparatus identification information stored in the another apparatus identification information memory unit, and decrypts the second data based on the password obtained, and performs the processing with respect to the decrypted second data.

* * * * *